United States Patent
Dawson et al.

(10) Patent No.: US 7,533,181 B2
(45) Date of Patent: May 12, 2009

(54) APPARATUS, SYSTEM, AND METHOD FOR DATA ACCESS MANAGEMENT

(75) Inventors: Colin Scott Dawson, Tucson, AZ (US); Erick Christian Kissel, Tucson, AZ (US); David Michael Morton, Tucson, AZ (US); William J. Scheid, III, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 10/787,333

(22) Filed: Feb. 26, 2004

(65) Prior Publication Data

US 2005/0193128 A1   Sep. 1, 2005

(51) Int. Cl.
G06F 15/16 (2006.01)
G06F 15/173 (2006.01)
G06F 9/445 (2006.01)

(52) U.S. Cl. ............ 709/229; 709/218; 709/223; 709/226; 717/174

(58) Field of Classification Search .......... 709/229, 709/218, 223, 226
See application file for complete search history.

(56) References Cited

U.S. PATENT DOCUMENTS

| 6,298,439 | B1 | 10/2001 | Beglin | 713/1 |
|---|---|---|---|---|
| 6,381,674 | B2 | 4/2002 | DeKoning et al. | 711/113 |
| 6,446,176 | B1 | 9/2002 | West et al. | 711/162 |
| 6,457,098 | B1 | 9/2002 | DeKoning et al. | 711/114 |
| 6,477,617 | B1 | 11/2002 | Golding | 711/112 |
| 6,507,883 | B1 | 1/2003 | Bello et al. | 711/4 |
| 6,598,134 | B2 | 7/2003 | Ofek et al. | 711/162 |
| 6,952,737 | B1* | 10/2005 | Coates et al. | 709/229 |
| 7,191,225 | B1* | 3/2007 | Borthakur | 709/213 |
| 7,203,801 | B1* | 4/2007 | Sharma et al. | 711/148 |
| 7,216,253 | B2* | 5/2007 | Miller et al. | 714/15 |
| 7,254,636 | B1* | 8/2007 | O'Toole et al. | 709/230 |
| 2002/0099797 | A1 | 7/2002 | Merrell et al. | 709/219 |
| 2002/0143942 | A1 | 10/2002 | Li et al. | 709/225 |
| 2002/0174330 | A1 | 11/2002 | Cabrera et al. | 713/100 |
| 2002/0188590 | A1 | 12/2002 | Curran et al. | 707/1 |
| 2002/0188711 | A1 | 12/2002 | Meyer et al. | 709/223 |
| 2002/0188733 | A1* | 12/2002 | Collins et al. | 709/229 |
| 2003/0005350 | A1 | 1/2003 | Koning et al. | 714/4 |
| 2003/0018927 | A1 | 1/2003 | Gadir et al. | 714/4 |
| 2003/0061399 | A1 | 3/2003 | Wagener et al. | 709/321 |
| 2003/0065782 | A1* | 4/2003 | Nishanov et al. | 709/226 |
| 2003/0074528 | A1 | 4/2003 | Soejima et al. | 711/114 |
| 2003/0078946 | A1 | 4/2003 | Costello et al. | 707/201 |
| 2003/0093509 | A1 | 5/2003 | Li et al. | 709/223 |
| 2003/0115313 | A1 | 6/2003 | Kanada et al. | 709/223 |
| 2003/0115411 | A1 | 6/2003 | McBrearty et al. | 711/114 |

(Continued)

*Primary Examiner*—Nathan J Flynn
*Assistant Examiner*—Kishin G Belani
(74) *Attorney, Agent, or Firm*—Kunzler & McKenzie

(57) ABSTRACT

An apparatus, system, and method are disclosed for data access management on a storage device connected to a storage area network. A client includes network connections to a first and second network, where the second network comprises a storage area network (SAN). The client also includes a storage management client and a storage agent. The storage agent is configured to minimize the amount of metadata processing that occurs on the client by sending the metadata or a copy thereof to a storage server to be stored in a centralized metadata database. The storage server also includes a storage manager that is configured to manage data access by the storage agent to the requested storage device.

24 Claims, 11 Drawing Sheets

U.S. PATENT DOCUMENTS

| | | |
|---|---|---|
| 2003/0115433 A1 | 6/2003 | Kodama ..................... 711/162 |
| 2003/0120751 A1 | 6/2003 | Husain et al. ............... 709/219 |
| 2003/0126132 A1 | 7/2003 | Kavuri et al. ................ 707/10 |
| 2003/0126200 A1 | 7/2003 | Wolff ......................... 709/203 |
| 2003/0135385 A1 | 7/2003 | Karpoff ........................ 705/1 |
| 2003/0135609 A1 | 7/2003 | Carlson et al. ............. 709/224 |
| 2003/0142552 A1 | 7/2003 | Green .................... 365/189.01 |
| 2003/0154238 A1 | 8/2003 | Murphy et al. .............. 709/201 |
| 2005/0123122 A1* | 6/2005 | Porter et al. ................ 379/243 |
| 2005/0138162 A1* | 6/2005 | Byrnes ....................... 709/223 |
| 2007/0094354 A1* | 4/2007 | Soltis ......................... 709/218 |
| 2007/0180446 A1* | 8/2007 | Sirota et al. ................ 717/174 |

\* cited by examiner

APPARATUS, SYSTEM, AND METHOD FOR DATA ACCESS MANAGEMENT

BACKGROUND OF THE INVENTION

1. Field of the Invention

This invention relates to electronic data storage and more particularly relates to management of metadata related to data access on shared electronic storage resources.

2. Description of the Related Art

Networked computing environments, also referred to as distributed computing environments, allow many user computers to be interconnected by a network communication channel. The network communication channel may include a local area network (LAN), a wide area network (WAN), a wireless network (WiFi or 802.11x), a metropolitan area network (MAN), or one of many variations of these types of networks. These data communication channels are used to transfer data among clients, servers, storage devices, and other network equipment and nodes.

One important application of network communications involves distributed storage technology where many different clients are able to transfer data to and store data on shared storage resources. A LAN backup topology, for example, allows many clients to send storage data to shared storage resources via a storage server connected to the LAN. Unfortunately a LAN backup topology may allow data storage operations to consume a large portion of the network resources.

Another type of network that may be dedicated to data transfers primarily used for storage and retrieval is a storage area network (SAN). A SAN backup topology allows many clients to communicate large amounts of storage data (also referred to as end-user data, file data, primary data, etc.) to a shared storage device without using the network resources of a corresponding LAN, for example. This type of backup topology is also known as a LAN-free backup topology because the LAN resources are, for the most part, not used to transfer the file data between the client and the storage device.

Some SAN backup topologies also employ one or more storage agents, which may perform functions similar to a storage server. By installing a storage agent on a client, for example, the storage agent may reduce the demand for storage server resources. The storage agent may communicate with the storage server over the LAN, but may send the file data directly to the storage device over the SAN, relieving the storage server of actual file data transfer operations.

When storing client-specific file data on shared storage devices, such as using a SAN, a data access operation typically involves processing metadata as well as storing the file data. Metadata for a data access operation is the information that is stored by a storage application that may describe who owns the file data, what attributes are associated with the file data, access rights to the file data, and other related information. In existing SAN backup topologies that employ storage agents, each storage agent may act like a local storage server processing metadata at the client, such as processing data access searches and queries, and so forth.

Coordinating and managing the metadata for all of the file data stored on the distributed storage resources in this way, however, can produce significant network inefficiency and metadata redundancy. For example, the storage agent may require that the storage server send a copy of the metadata back to the storage agent so that the storage agent can perform metadata filtering, searches, and queries related to a data access operation. The storage server, however, may be capable of performing similar metadata processing without duplicating the metadata or transferring the metadata over the LAN. In other words, remote processing of metadata operations at the storage agent located on the client introduces inefficiency and increased overhead related to a data access operation.

Consequently, an apparatus, system, and method are needed that overcome the networking inefficiencies and metadata duplication introduced by allowing storage agents to perform substantial metadata operations at the client. Beneficially, such an apparatus, system, and method would also overcome inefficiencies and overhead costs associated with data access failures experienced by a storage agent.

SUMMARY OF THE INVENTION

The present invention has been developed in response to the present state of the art, and in particular, in response to the problems and needs in the art that have not yet been fully solved by currently available storage servers, storage agents, and clients. Accordingly, the present invention has been developed to provide an apparatus, system, and method for data access management on a storage device connected to a storage area network that overcome many or all of the above-discussed shortcomings in the art.

The client for data access management on a storage device connected to a storage area network is provided with a logic unit containing a plurality of modules configured to functionally execute the necessary steps of data access management on a storage device connected to a storage area network. These modules in the described embodiments include a volume management module, a failover module, a write module, and a read module, all within a storage agent.

The storage agent, in one embodiment, is configured to minimize metadata processing on the client by communicating at least a portion of the metadata to the storage server to be exclusively stored in a centralized metadata database on the storage server. The client also includes a storage management client that is configured, in one embodiment, to communicate with the storage server and coordinate use of the storage device.

The volume management module, in one embodiment, is configured to coordinate exclusive or priority access to a volume accessible via the SAN. Coordinating such data access may include preempting non-priority use, waiting for release of the volume by the storage server or another storage agent, proxying the data to the storage server in response to a data access failure (via the failover module), and so forth.

The write and read modules are configured, in one embodiment, to respectively write file data to and read file data from a storage device in a data access system. The read and write modules are further configured to use the metadata in a centralized metadata database on a storage server rather than storing the metadata on the client. In this way, the writing and reading operations may occur more quickly compared to a client which requests large metadata transfers from the storage server in order to process each data access request at the client. In one embodiment, the metadata may include file data size and content indicators, device characteristics, media characteristics, positioning indicators, append position indicators, and related information. In a further embodiment, the metadata may include other descriptors, indicators, flags, and so forth.

The storage server is configured, in one embodiment, to maintain the metadata in the centralized metadata database and process the metadata as required to respond to data access requests by the clients. The storage server may further include a storage manager that is configured to manage data access by the storage agent to a storage device, including volume management, preemption, failover, and so forth.

A system of the present invention is also presented and used for data access management on a storage device connected to a storage area network. The system may embody a local area network (LAN) and a storage area network (SAN) that are concurrently accessible by a storage server and one or more clients. In particular, the system, in one embodiment, includes a storage server and at least one client as described above. In a further embodiment, the storage server may not have direct access to the SAN.

A method of the present invention is also presented and used for data access management on a storage device connected to a storage area network. The method in the disclosed embodiments substantially includes the steps necessary to carry out the functions presented above with respect to the operation of the described apparatus and system. In one embodiment, the method includes receiving a data access request from a client, processing at least a portion of the metadata at the storage agent, accessing a storage device according to the metadata, communicating the metadata to the storage server, and exclusively storing at least a portion of the metadata in the centralized metadata database. The method also may include preempting use of the storage device by a non-priority client, proxying data from the requesting storage agent in response to a data access failure, updating or storing new metadata in the centralized metadata database according to a data access operation, and so forth.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
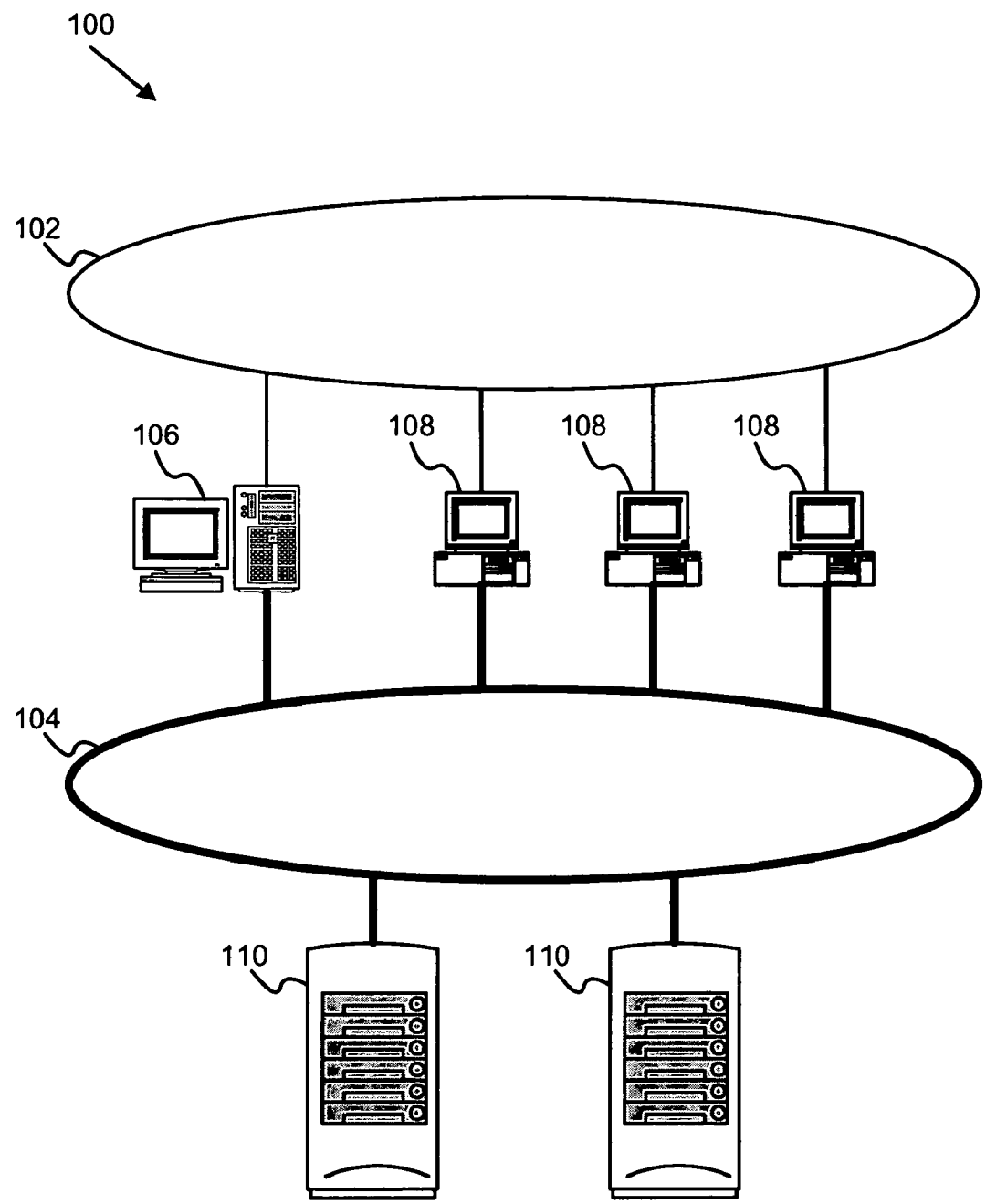
FIG. 1 is a schematic block diagram illustrating one embodiment of a data access system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a data access system 100 in which the present invention may be employed. The illustrated data access system 100 includes a first network 102 and a second network 104. In one embodiment, the first network 102 may be a local area network (LAN) or a wide area network (WAN) or another similar network that employs a data communication protocol, such as TCP/IP, for communicating data and other communications among network nodes. Reference to a LAN in the following description refers to the first network 102.

The second network 104, in one embodiment, is a storage area network (SAN) that is dedicated to storage data communications for sending storage data, for example, to or from a storage resource node. The storage data also may be referred to as file data, as distinguished from metadata that may describe the file or storage data. Reference to a SAN in the following description refers to the second network 104.

The depicted data access system 100 portrays a storage server 106 and several user computers 108. The user computers 108 also may be referred to as clients or end points. The storage server 106 and each of the several clients 108 are connected to both the LAN 102 and the SAN 104. However, in another embodiment, the storage server 106 may not have direct addressability to the SAN 104. The clients 108 and the storage server 106 are each described in more detail with reference to FIGS. 2 and 3, respectively.

The SAN 104 provides a connection from the storage server 106 and each of the clients 108 to one or more storage devices 110. The storage devices 110 may comprise hard disk drives, optical disk drives, tape drives, RAM drives, or another type of device using a similar storage medium, or a combination of different storage drives and media. The storage devices 110 comprise shared data storage resources and are generally used to store file data from the clients 108. Each client 108 may store data on a single storage device 110 or multiple devices 110 according to a storage scheme administered at least in part by the storage server 106. The server 106 and the clients 108 additionally may each have one or more local storage devices (not shown). In one embodiment, a storage device 110 may be selectively made available to a single client 108 connected to the SAN 104 and made unavailable to other clients 108.

The illustrated data access system 100 may be referred to as a LAN-free backup system because the network topology allows the storage server 106 and clients 108 to transfer file data over the SAN during backup and restore operations rather than over the LAN. Although not depicted in FIG. 1, the data access system 100 also may include a network server, additional user computers 108, additional storage devices 110, and so forth. Additionally, this additional network equipment may or may not have access to the SAN 104.

Figure 2:
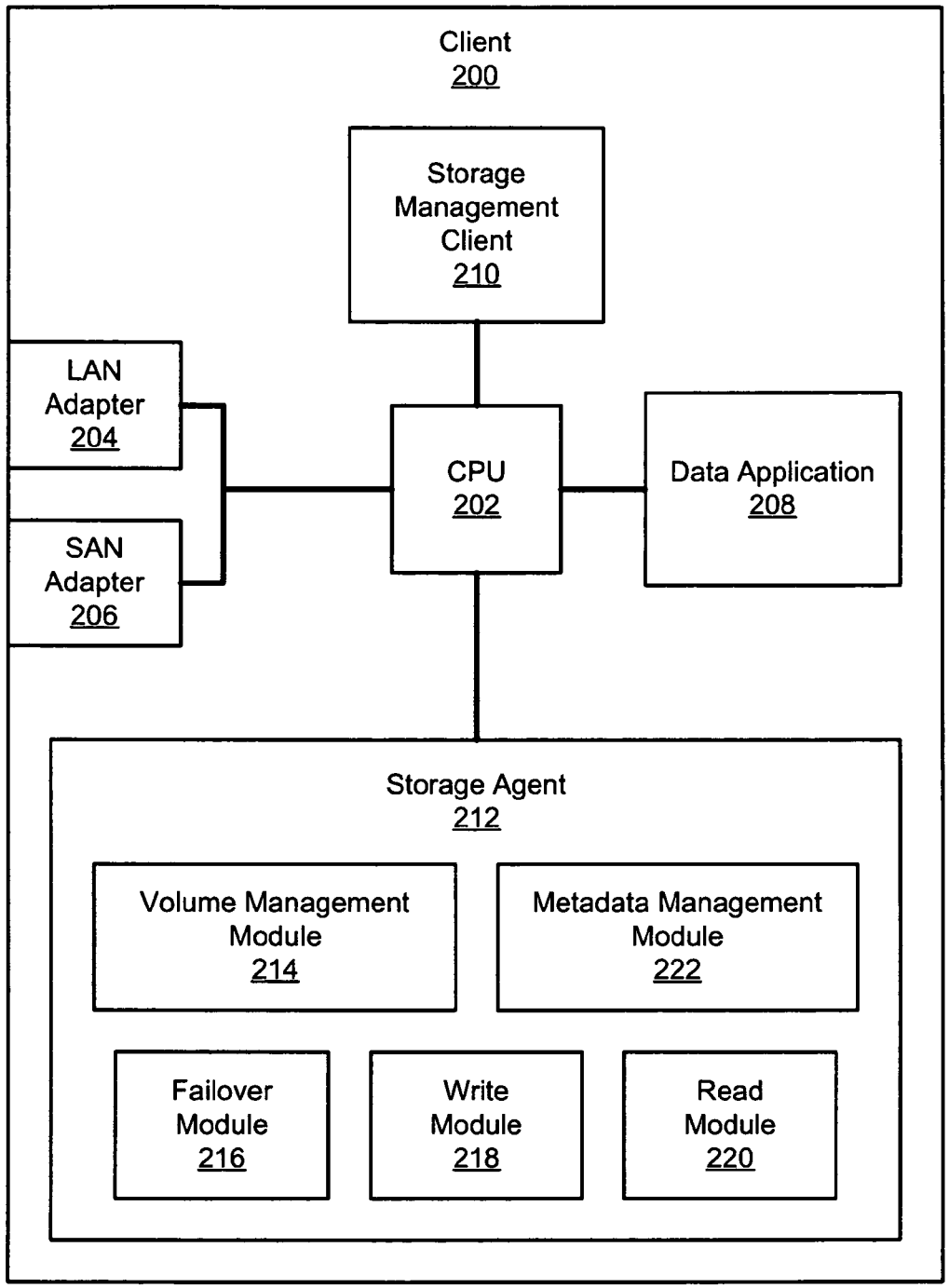
FIG. 2 is a schematic block diagram illustrating one embodiment of a client configured to operate in the data access system of FIG. 1.

FIG. 2 depicts one embodiment of a client 200 that is representative of the clients 108 shown in FIG. 1. The client 200 is configured, in one embodiment, to perform data operations using the network resources. The illustrated client 200 includes a central processing unit (CPU) 202, a LAN adapter 204, a SAN adapter 206, a data application 208, a storage management client 210, and a storage agent 212. Alternately, the storage agent 212 and storage management client 210 may be on separate machines. Although not depicted, the client 200 also may comprise additional hardware and software that is typical in a user computer 108 connected to a LAN 102, including a local storage device, a user interface, a local memory device, and so forth.

The CPU 202 is configured generally to execute operations within the client 200. The LAN adapter 204 is configured, in one embodiment, to allow the client 200 to physically connect to the LAN 102 and to facilitate communications between the client 200 and the storage server 106. For example, the LAN adapter 204 may be an Ethernet or Fibre Channel interface. The SAN adapter 206 is configured, in one embodiment, to allow the client 200 to physically connect to the SAN 104 and to facilitate communications between the client 200 and the storage device 110. For example, the SAN adapter 206 may be a host bus adapter (HBA).

The data application 208 may be any data application that generates file data that needs to be stored on a storage device 110. For example, the data application 208 may be a database, a mission critical application, or another similar application. In general, the data application 208 creates or otherwise obtains file data to be stored on one or more storage devices 110. In one embodiment, the file data is already stored on a storage device 110 or a local storage device. The storage management client 210, in one embodiment, is configured to manage the client-side data storage operations that allow the file data to be stored on the storage devices 110. These data storage operations are also referred to as data access operations.

The storage agent 212 is configured, in one embodiment, to facilitate data access operations and, in particular, to minimize the amount of metadata processing that may be required at the client 200. Each data access, whether a read or write operation, is accompanied by some amount of metadata. With regard to a read operation, the metadata may include at least the location on a storage device at which the file data is currently stored. In the case of a write operation, the metadata may indicate a storage pool in which to store the file data, as well as a data size to indicate the total amount of storage space required to store the file data. The metadata for a data access operation may include many other indicators and parameters depending on the type of data access requested. For example, the metadata may include device characteristics, media characteristics, positioning information, append position information, and other related information.

The illustrated storage agent 212 includes a volume management module 214, a failover module 216, a write module 218, a read module 220, and a metadata management module 222. The volume management module 214, in one embodiment, is configured to coordinate access to a volume within a storage pool on the storage devices 110. The volume management module 214 may communicate with the storage server 106 in order to coordinate volume access.

The failover module 216 is configured, in one embodiment, to provide alternative data access to the storage devices 110 in case the storage agent 212 is unable to fulfill a given data access request from the storage management client 210. In one embodiment, the failover module 216 is configured to send the file data to the storage server 106 if the storage agent 212 is unable to perform a requested write command, for example.

The write module 218, in one embodiment, is configured to write file data to a volume on the storage devices 110 in response to a write request from the storage management client 210. Similarly, the read module 220 is configured, in one embodiment, to retrieve file data from a volume on the storage devices 110 in response to a read request from the storage management client 210. The read module 220, write module 218, failover module 216, and volume management module 214 will be referenced further in conjunction with the flow charts presented in FIGS. 4-11.

The metadata management module 222, in one embodiment, is configured to minimize metadata processing on the client 200 by communicating metadata to the storage server 300 so that the storage server 300 may exclusively store the metadata. More specifically, the metadata management module 222 may be configured to optimize metadata processing by offloading most metadata searches and queries, for example, to the storage server 300 to be performed by the storage server 300 instead of by the client 200. In this way, the storage server 300 does not need to transfer a copy of the metadata to the client 200 in order to process a data access request, such as a read or write request.

Figure 3:
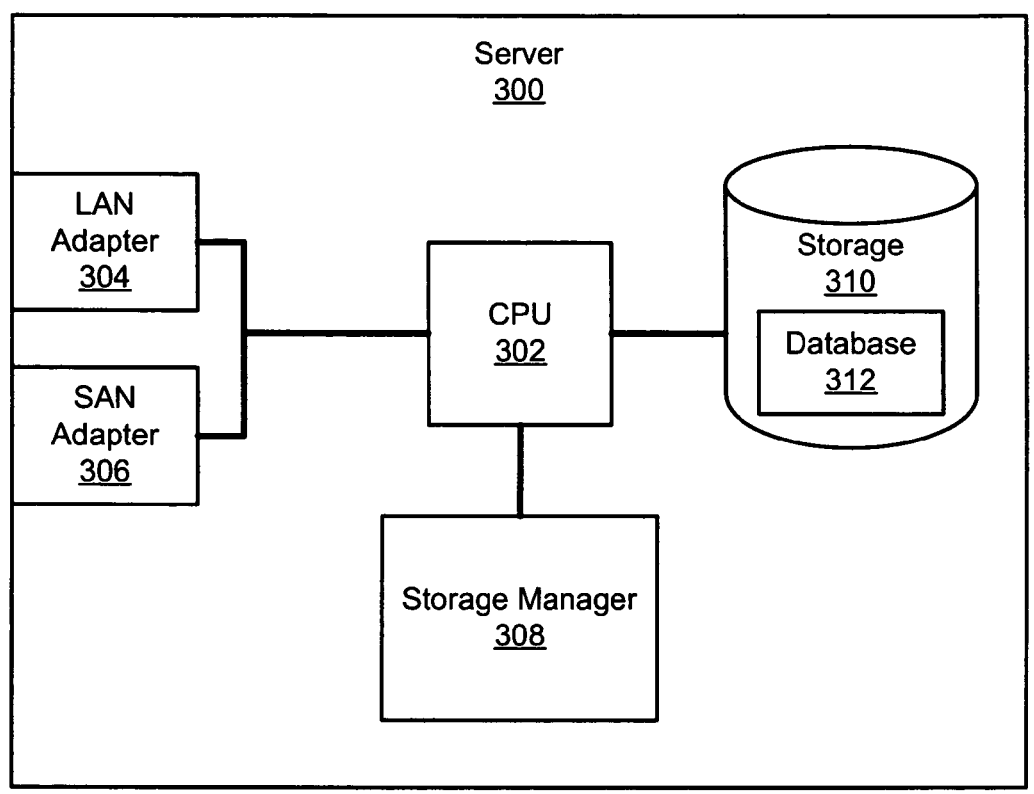
FIG. 3 is a schematic block diagram illustrating one embodiment of a storage server configured to operate in the data access system of FIG. 1.
Figure 4:
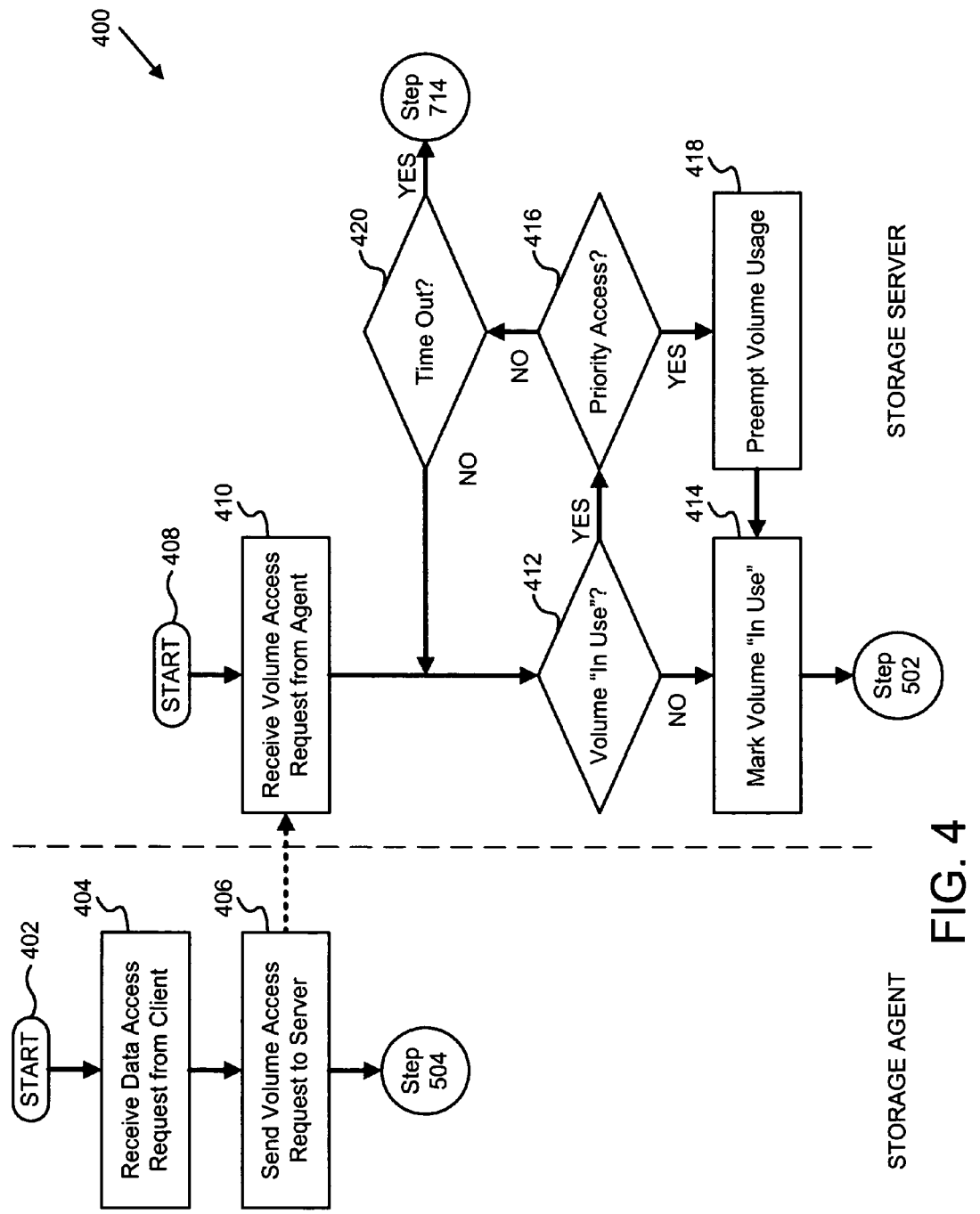
FIGS. 4-7 are a schematic flow chart diagram illustrating one embodiment of a data access management method in accordance with the present invention.
Figure 5:
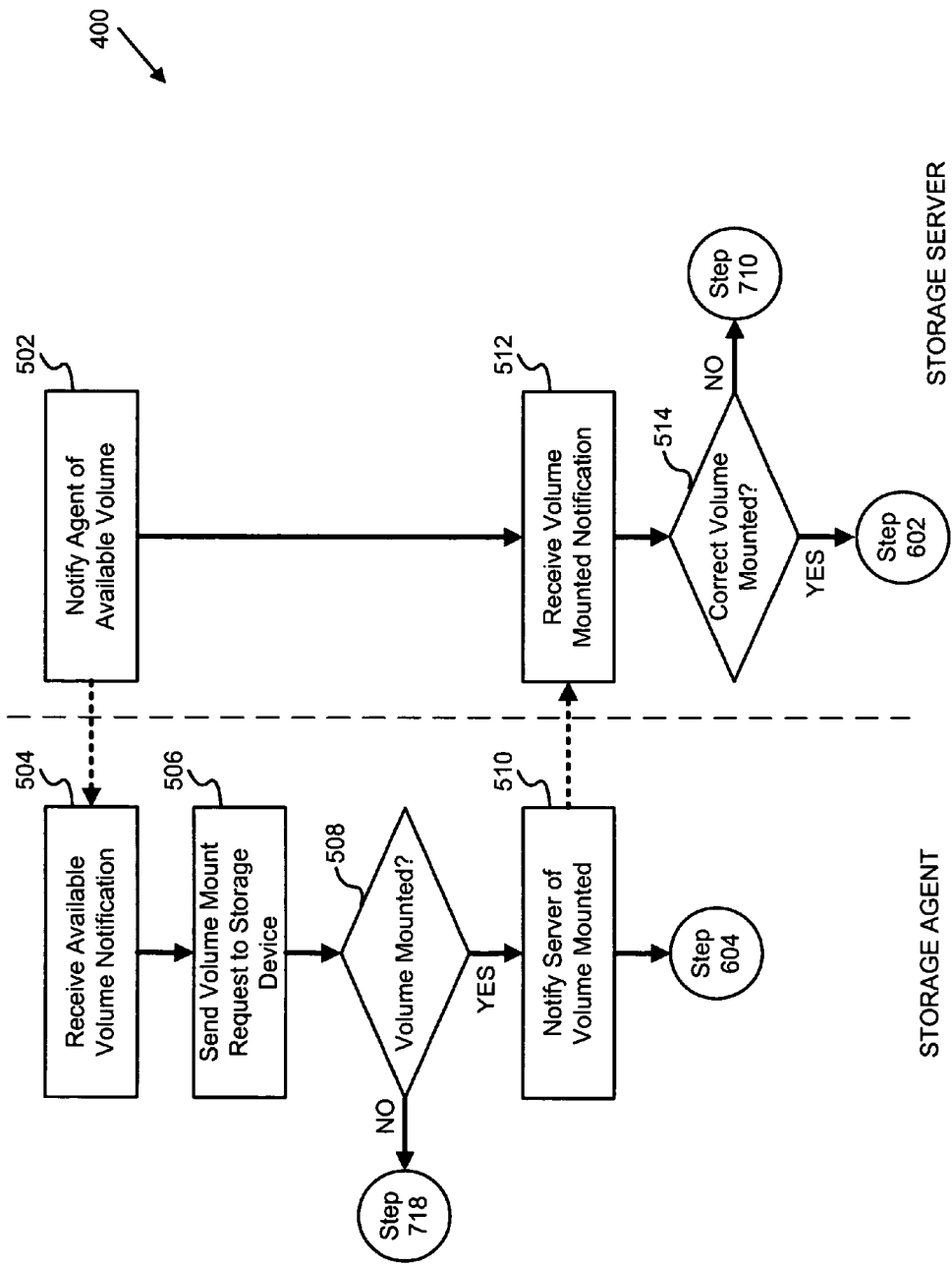
Figure 6:
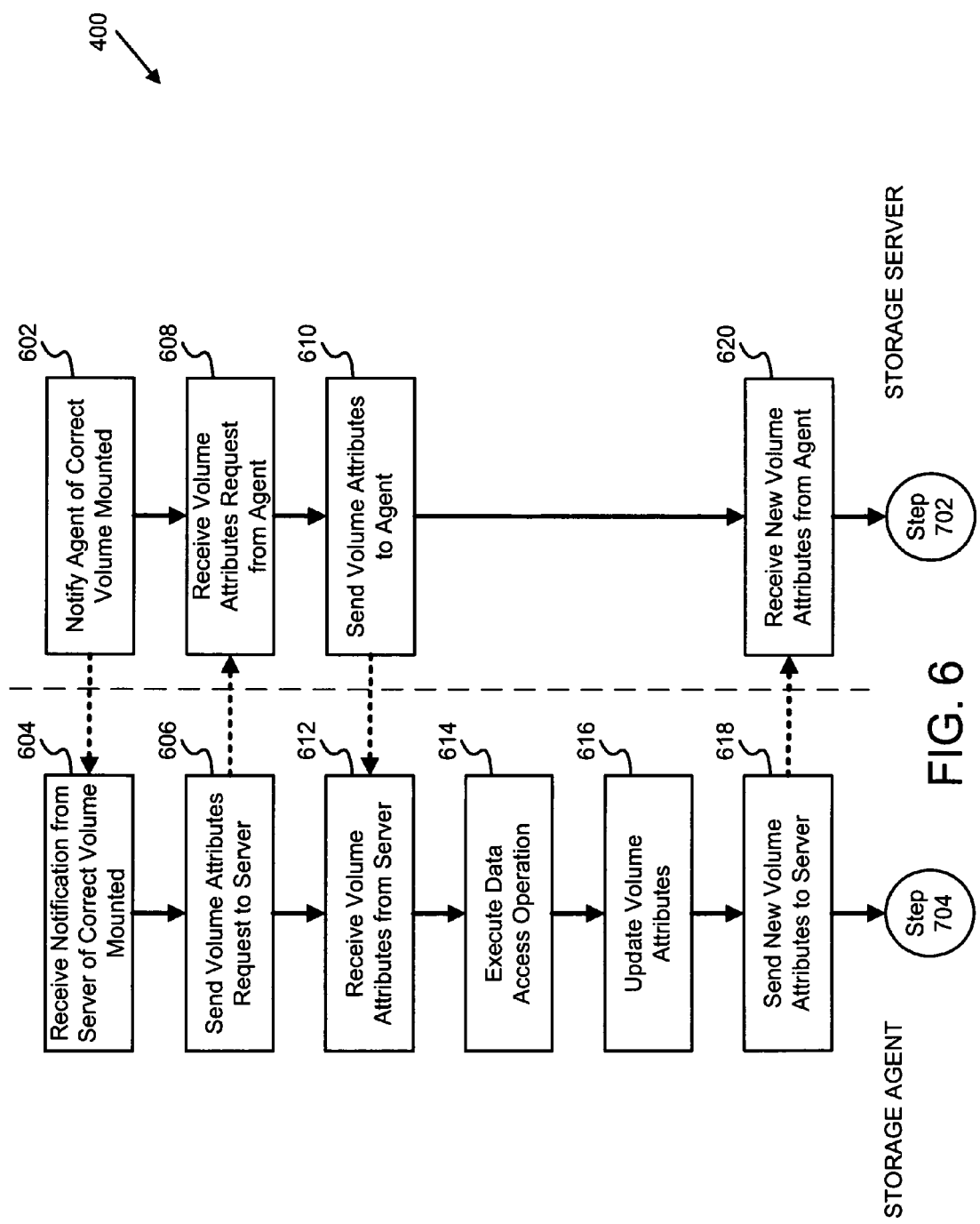
Figure 7:
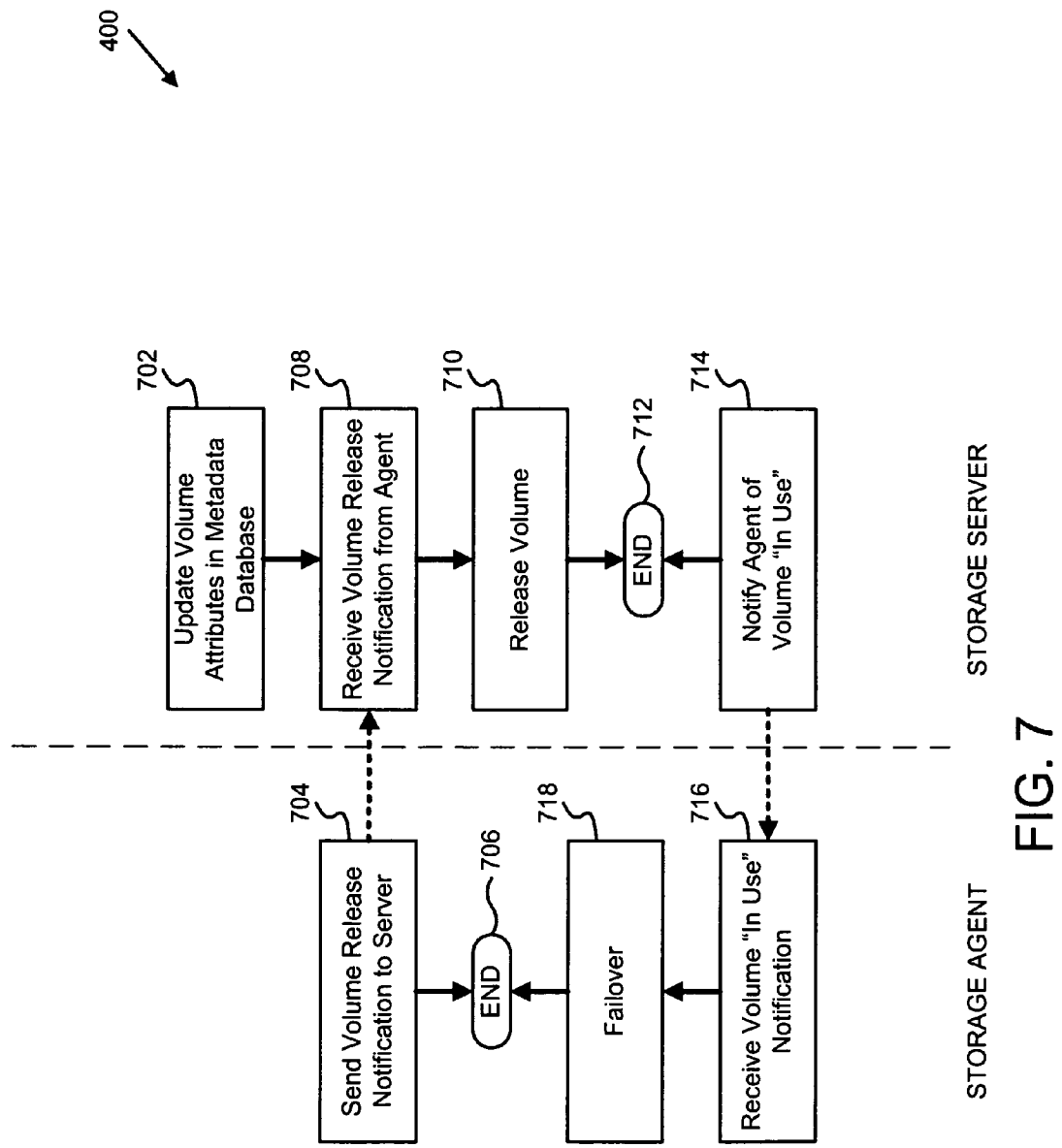

FIG. 3 depicts one embodiment of a storage server 300 that is representative of the storage server 106 shown in FIG. 1. The storage server 300 is configured, in one embodiment, to manage specific data access operations on the SAN 104. The illustrated storage server 300 includes a CPU 302, a LAN adapter 304, a SAN adapter 306, a storage manager 308, and a local storage device 310. Although not depicted, the storage server 300 also may comprise additional hardware that is typical of a network server configured to administer a LAN, WAN, SAN, or other type of communication network.

The CPU 302, LAN adapter 304, and SAN adapter 306 are substantially similar to the CPU 202, LAN adapter 204, and SAN adapter 206 of the client 200 described above with reference to FIG. 2. As mentioned previously, the storage server 300 may or may not have a SAN adapter 306 depending on the topology of the SAN 104. However, in one embodiment, the SAN adapter 306 is necessary in order for the storage server 300 to perform data access operation in the event of a failover operation at one of the clients 200. Alternately, the storage server 300 may manage a failover operation without a SAN adapter 306 by requesting that another client 200 handle the data access operation in proxy for the failover client 200.

The storage manager 308 is configured, in one embodiment, to manage data access to the storage devices 110 by the clients 200. For example, the storage manager 308 may communicate via the LAN 102 with the storage agent 212 of a given client 200 to coordinate volume access for a read or write operation. The local storage device 310, in one embodiment, may be a disk drive or other device capable of maintaining a database 312. Alternately, the database 312 may be stored in a local memory device (not shown). In a further embodiment, a portion of the database 312 or the entire database 312 may be replicated in distinct locations on the local storage device 310, a local memory device, a storage device 110, or a combination thereof.

The database 312, in one embodiment, is a metadata database 312 configured to store metadata that describes the file data stored on the storage devices 110. As described above, the metadata may comprise file data size and content characteristics, device characteristics, media characteristics, positioning information, append position information, and other related information. In a further embodiment, the metadata database 312 serves as a centralized location for storing the metadata. In other words, all of the metadata associated with the file data stored on the storage devices 110 may be stored in the centralized metadata database 312 on the storage server 300.

By storing all of the metadata in the centralized metadata database 312, the storage agent 212 is precluded from consuming LAN resources for processing and storing the metadata. Furthermore, the LAN 102 may be relieved of significant data transfer operations related to transferring large amounts of metadata from the storage server 300 to a client 200 in order for the storage agent 212 on the client 200 to perform updates, queries and other database operations.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect to one or more steps, or portions thereof, of the illustrated process. Additionally, the format and symbology employed are provided to explain the logical steps of the process and are understood not to limit the scope of the process. Although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process. Additionally, the order in which a particular process occurs may or may not strictly adhere to the order of the corresponding steps shown.

FIGS. 4 through 7 depict one embodiment of a data access management method 400 that may be employed on the data access system 100 shown in FIG. 1. The illustrated data access management method 400 exemplifies the type of interactions between the storage server 300 and a storage agent 212 on a client 200 surrounding a data access operation. Although not specifically addressed in the following description, the storage management client 210 on the client 200 also may be involved in some of the features and communications described.

The illustrated data access management method 400 begins 402 in response to a data access request received 404 by the storage agent 212 from the storage management client 210. In one embodiment, the data access request may be a write request, a read request, or another similar data access request. The storage agent 212 then sends 406 a volume access request to the storage server 300. The storage server 300 receives 410 the volume access request from the storage agent 212 and determines 412 if the necessary volume is currently in use for another data access operation. If the requested volume is not in use, the storage server may mark 414 the volume in use by the requesting storage agent 212 or client 200.

However, if the volume is currently in use for another data access operation, the storage server 300 may determine 416 if the requesting storage agent 212 should have priority access to the requested volume. For example, a priority storage agent 212 may have priority access to a volume over a non-priority storage agent 212. In another embodiment, priority may be assigned according to each client connected to the SAN 104. In a further embodiment, priority access may be determined based on the type of data access operation requested, the amount of data to be stored, the user logged onto the requesting client 200, or one or more of these and other priority factors. In one embodiment, priority access may be indicated in the metadata associated with the data access request.

If the storage server 300 determines 416 that the requesting storage agent 212 has priority access to the volume, the storage server 300 may preempt 418 usage of the requested volume by a non-priority storage agent 212 or for a non-priority data access operation. Alternately, if the storage server 300 determines 416 that the requesting storage agent 212 does not have priority access, the storage server 300 may iteratively wait a predetermined time period and return to determine 412 if the volume is still in use during a time out period 420.

If the volume ultimately becomes available to the requesting storage agent 212, the storage server 300 notifies 502 the storage agent 212 that the volume is available. The available volume notification also may include volume attributes corresponding to the available volume. Upon receiving 504 the notification that the volume is available, as well as any volume attributes, the storage agent 212 sends 506 a volume mount request to the storage device 110. The storage agent 212 then determines 508 if the volume is correctly mounted. If the storage agent 212 determines 508 that the volume is correctly mounted, the storage agent 212 notifies 510 the storage server 300 that the volume is correctly mounted. The storage server 300, upon receiving 512 the notification, may verify 514 that the correct volume is mounted.

If the correct volume is mounted, the storage server 300 notifies 602 the storage agent 212 that the correct volume is mounted and the storage agent 212 receives 604 the notification from the storage server 300. The storage agent 212 then sends 606 a volume attribute request to the storage server 300 and the storage server 300 receives 608 the volume attribute request and sends 610 the volume attributes 610 to the storage agent 212. Alternately, the volume attributes may be automatically sent from the storage server 300 to the storage agent 212 when the storage server 300 notifies 502 the storage agent 212 of the available volume, as described with reference to FIG. 5. The volume attributes may comprise some or all of the metadata described above, as well as other pertinent metadata.

Upon receiving 612 the volume attributes from the storage server 300, the storage agent 212 executes 614 the data access operation via the SAN 614, updates 616 the volume attributes, and sends 618 the new volume attributes to the storage server 300. The storage server 300 then receives 620 the new volume attributes from the storage agent 212 and updates 702 the volume attributes in the centralized metadata database 312.

After sending 618 the updated volume attributes, the storage agent 212 sends 704 a volume release notification to the storage server 300 to indicate that the storage agent 212 is no longer using the mounted volume. The depicted data access management method 400 then ends 706 with regard to the storage agent 212.

The storage server 300 receives 708 the volume release notification from the storage agent 212 and subsequently releases 710 the volume. Although not shown, the volume may be demounted from the storage device 110 after it is released by the storage agent 212 and the storage server 300. However, the decision to demount the volume or maintain the volume mounted for some period of time may be influenced by other storage management factors such as time, efficiency, default settings, and so forth. The depicted data access management method 400 then ends 712 with regard to the storage server 300.

Returning to the previous explanation of priority access, if the storage server 300 determines 416 that the storage agent 212 does not have priority access, the storage server 300 may notify 714 the storage agent 212 that the requested volume is in use and unavailable for the requested data access operation. In this case, the storage agent 212 receives 716 the notification from the storage server 300 and may failover 718, which will be discussed further with respect to FIG. 11. Alternately, the storage agent 212 may attempt to mount a scratch volume, if available, but may receive 716 the same notification if a scratch volume is not available. Similarly, the storage agent 212 may failover 718 if it determines 508 that the requested volume is not mounted by the storage device 110, possibly indicating a hardware or software failure in the storage device 110. In a similar way, the storage server 300 may release 710 the volume so that it is not marked in use if the storage server 300 determines 514 that the correct volume is not mounted.

Figure 8:
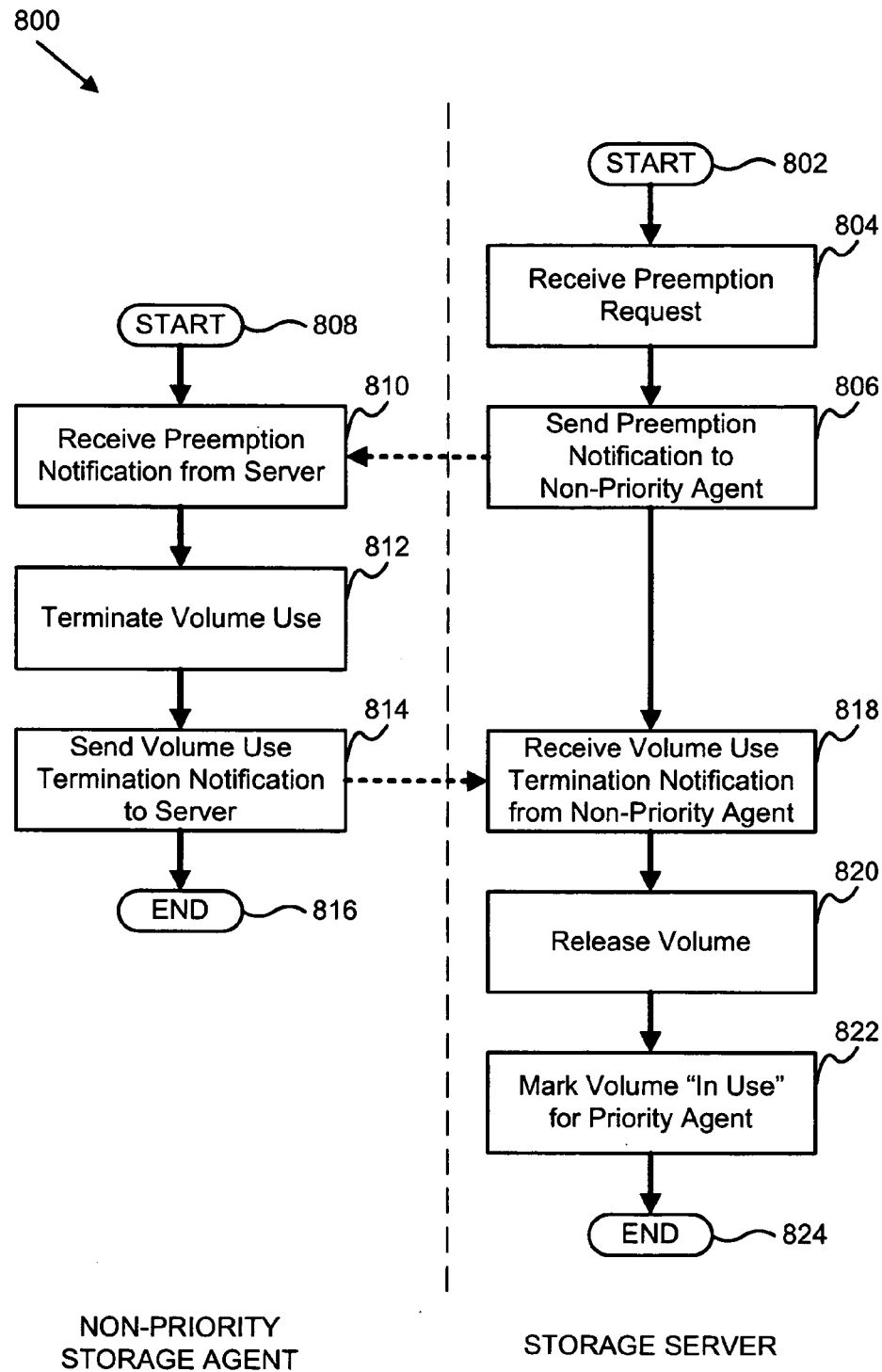
FIG. 8 is a schematic flow chart diagram illustrating one embodiment of a preemption method in accordance with the present invention.

FIG. 8 depicts one embodiment of a preemption method 800 given by way of example of the preemption feature 418 of the data access management method 400. The illustrated preemption method 800 begins 802 when the storage server 300 receives 804 a preemption request. In one embodiment, the storage manager 308 initiates the preemption method 800 in response to determining that a requesting storage agent 212 should have priority access to a volume that is in use by a separate, non-priority storage agent 212.

Upon receiving 804 the preemption request, the storage server 300 sends 806 a preemption notification to the non-priority storage agent 212 to notify the storage agent 212 that the volume will be made unavailable for either a specified or indeterminate time period. The non-priority storage agent 212 then receives 810 the preemption notification and terminates 812 use of the requested volume. Termination may be effectuated within a predetermined time period, in one embodiment, or immediately, in another embodiment, or as determined by the non-priority storage agent 212 itself, i.e. at a suitable moment before, after, or during a data access operation.

The non-priority storage agent 212 then sends 814 a volume use termination notification to the storage server 300. The depicted preemption method 800 then ends 816 with respect to the non-priority storage agent 212. The storage server 300 receives 818 the volume use termination notification and subsequently releases 820 the volume, indicating that the volume is no longer in use by the non-priority storage agent 212. In an alternate embodiment, the storage server 300 may release 820 the volume prior to or without regard to receiving 818 a volume use termination notification from the non-priority storage agent 212. For example, the storage server 300 may release 820 the volume after a predetermined time period beginning at about the time the preemption notification was sent 806 to the non-priority storage agent 212.

After releasing 820 the requested volume, the storage server 300 may mark 822 the requested volume in use by the requesting priority storage agent 212, similar to marking 414 the volume in use during the data access management method 400. The depicted preemption method 800 then ends 824 with respect to the storage server 300.

Figure 9:
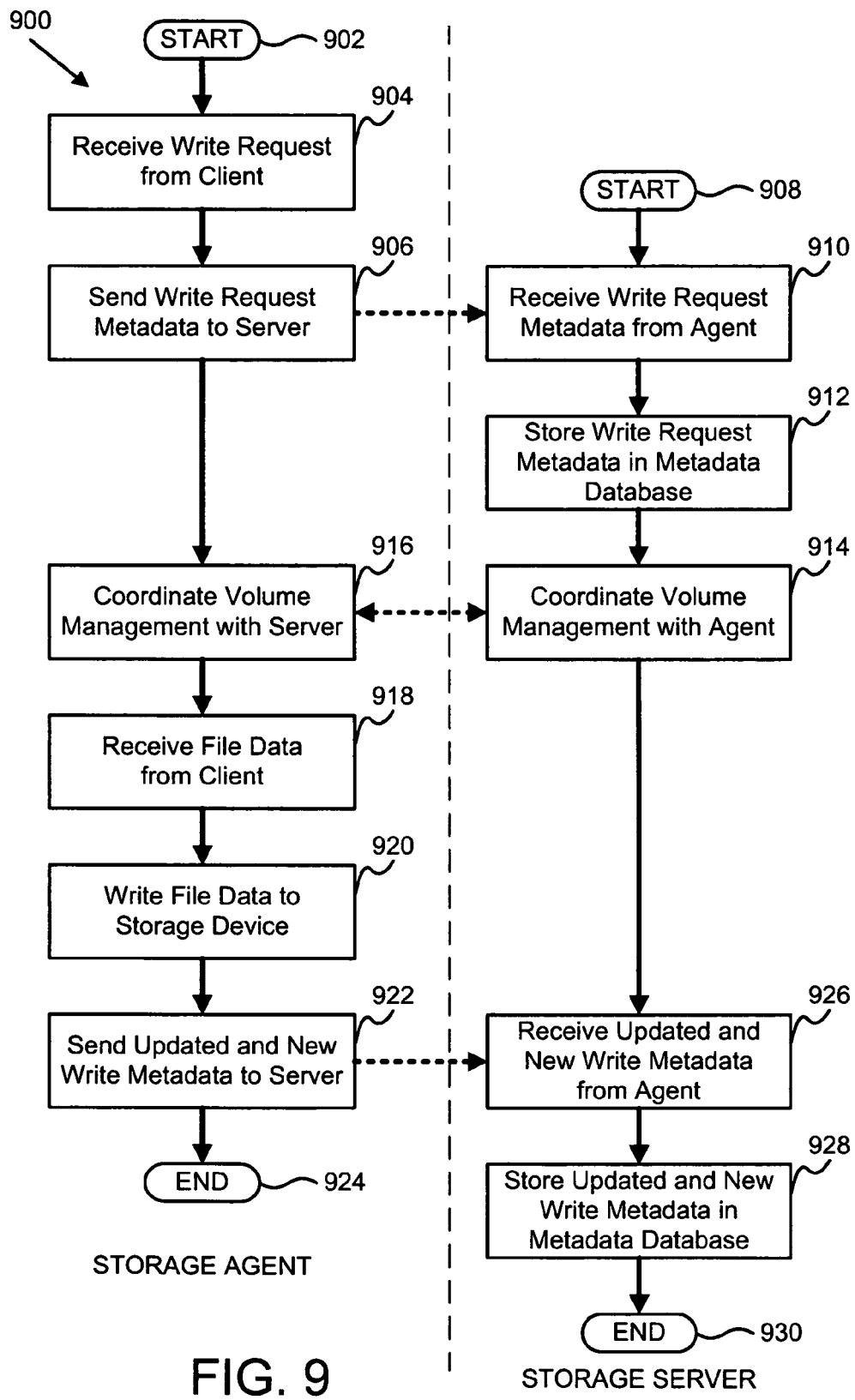
FIG. 9 is a schematic flow chart diagram illustrating one embodiment of a write method in accordance with the present invention.

FIG. 9 depicts one embodiment of a write method 900 that may be implemented on the data access system 100 of FIG. 1. In one embodiment, the write method 900 may be implemented at least in part by the write module 218.

The illustrated write method 900 begins 902 when the storage agent 212 receives 904 a write request from the corresponding storage management client 210. The storage agent 212 subsequently sends 906 a write request, including the write request metadata, to the storage server 300. In this way, when the storage server 300 receives 910 the write request metadata, the storage server 300 may be in possession of all of the metadata associated with the write request. In one embodiment, none of the write request metadata is exclusively stored on the client 200 because the storage agent 212 allows the storage server 300 to store 912 and manage all of the write data metadata in the centralized metadata database 312.

The storage server 300 and storage agent 212 then coordinate 914, 916 the data access, including the volume management. The data access management method 400 presented above is one example of how the storage server 300 and storage agent 212 may coordinate 914, 916 data access to a requested volume. During or after the coordination 914, 916, the storage agent 212 may receive 918 the file data from the storage management client 210.

The storage agent 212 subsequently writes 920 the file data to the requested volume on the storage device 110 using, in one embodiment, the write module 218. The storage agent 212 may create or otherwise obtain updated and new metadata regarding the file data stored on the storage device 110 during or after writing 920 the file data to the volume. In one embodiment, the updated metadata is an updated version of the write request metadata, describing the file data, owner, attributes, and so forth, received 910 from the storage server 300. The new metadata, in one embodiment, describes the position on the volume and the new location of the file data on the storage device 110. The storage agent 212 sends 922 the updated and new metadata to the storage server 300 and the depicted write method 900 then ends 924 with respect to the storage agent 212.

The storage server 300, upon receiving 926 the new metadata, may store 928 the updated and new metadata in the centralized metadata database 312. In one embodiment, the storage server 300 may save the updated metadata in place of the old metadata. Alternately, the storage server 300 may retain a copy of the previous version of the metadata in order to maintain a history or otherwise track the metadata in the database 312. The depicted write method 900 then ends 930 with respect to the storage server 300.

Figure 10:
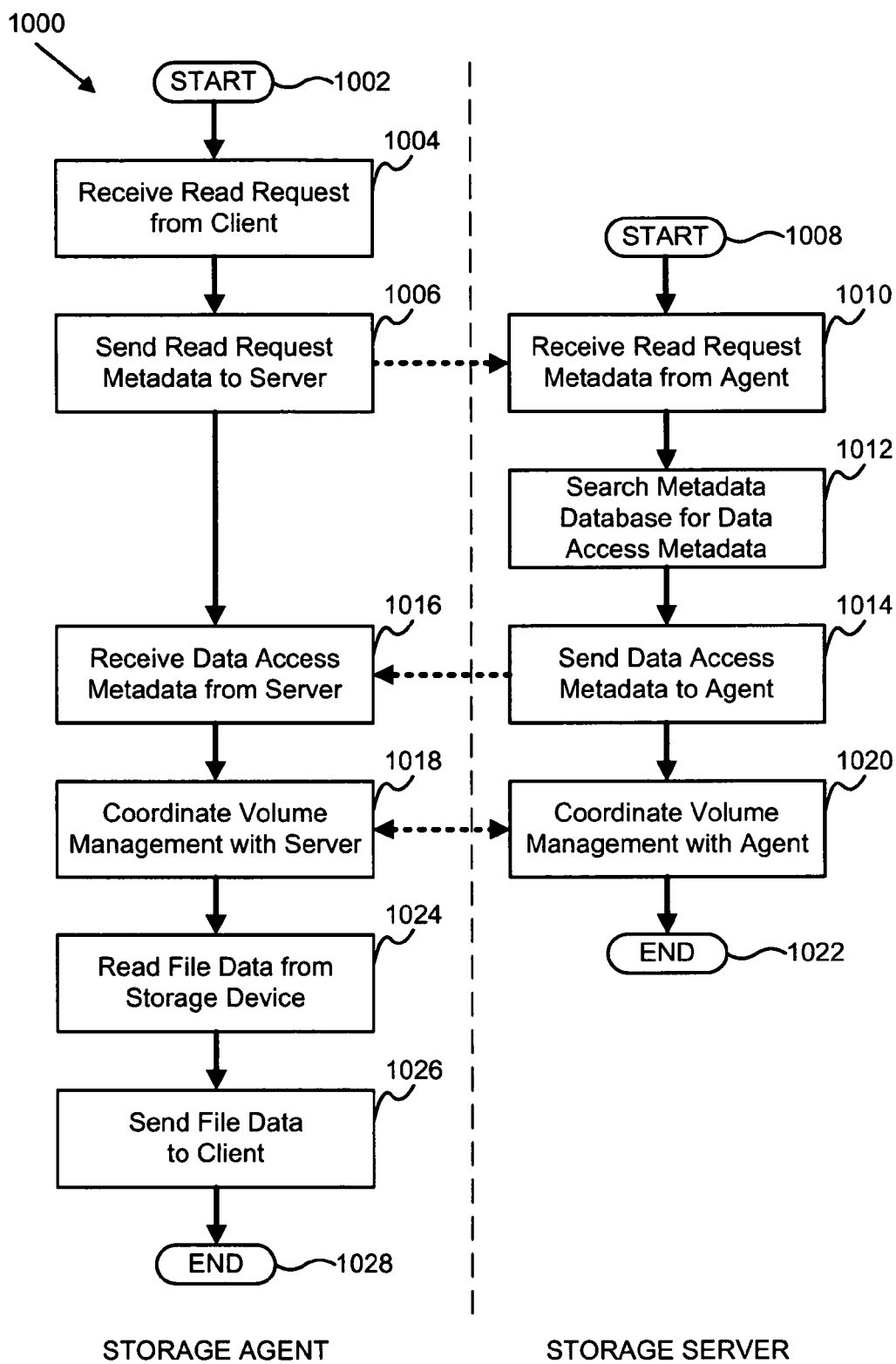
FIG. 10 is a schematic flow chart diagram illustrating one embodiment of a read method in accordance with the present invention.

FIG. 10 depicts one embodiment of a read method 1000 that may be implemented on the data access system 100 of FIG. 1. In one embodiment, the read method 1000 may be implemented at least in part by the read module 220.

The illustrated read method 1000 begins 1002 when the storage agent 212 receives 1004 a read request from the corresponding storage management client 210. The storage agent 212 subsequently sends 1006 a read request, including the read request metadata, to the storage server 300. In this way, when the storage server 300 receives 1010 the read request metadata, the storage server 300 is in possession of all of the metadata associated with the read request. In one embodiment, none of the read request metadata is exclusively stored on the client 200 because the storage agent 212 allows the storage server 300 to store and manage all of the read data metadata in the centralized metadata database 312.

The storage server 300 then searches 1012 the centralized metadata database 312 for data access metadata that allows the storage agent 212 to know where and how to access the file data on the storage device 110. The storage server 300 subsequently sends 1014 the data access metadata to the storage agent 212, which receives 1016 the data access metadata.

The storage agent 212 and storage server 300 then coordinate 1018, 1020 the data access, including the volume management. The data access management method 400 presented above is one example of how the storage agent 212 and storage server 300 may coordinate 1018, 1020 data access to a requested volume. The depicted read method 1000 then ends 1022 with respect to the storage server 300. During or after the coordination 1018, 1020, the storage agent 212 may read 1024 the file data from the correct volume and send 1026 the file data to the storage management client 210. The depicted read method 1000 then ends 1028 with respect to the storage agent 212.

Figure 11:
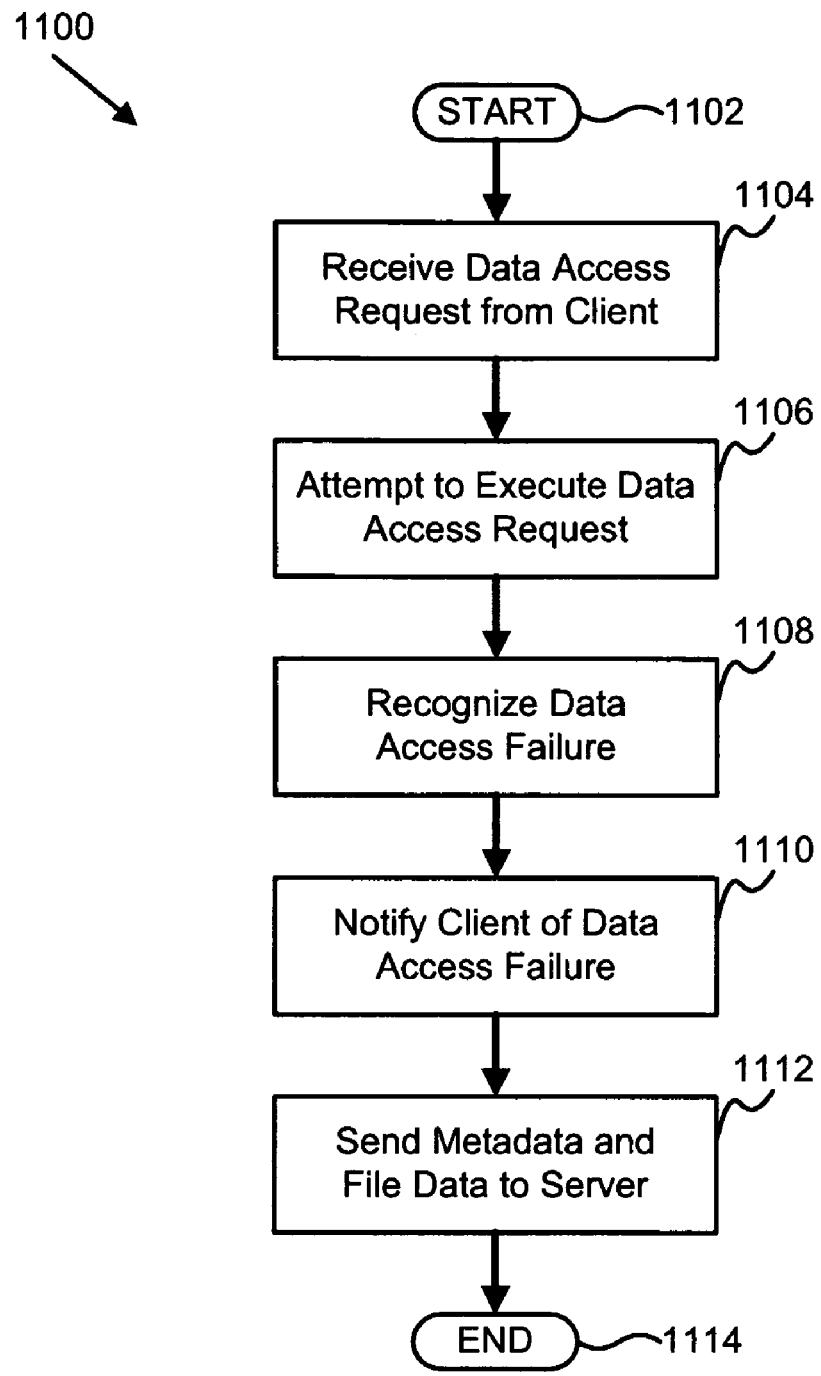
FIG. 11 is a schematic flow chart diagram illustrating one embodiment of a failover method in accordance with the present invention.

FIG. 11 depicts one embodiment of a failover method 1100 that may be performed on the data access system 100 of FIG. 1. In one embodiment, the failover method 1100 may be implemented at least in part by the failover module 216.

The illustrated failover method 1100 begins 1102 when the storage agent 212 receives 1104 a data access request, such as a read or write request, from the storage management client 210. The storage agent 212 then attempts 1106 to execute the data access request, but recognizes 1108 a failure in the data access operation. In one embodiment, upon recognizing 1108 a data access failure, the storage agent 212 may notify 1110 the client 200 of the data access failure. In a further embodiment, the storage agent 212 also may notify the storage server 300 of the data access failure.

The storage agent 212 subsequently may send 1112 the data access metadata and the corresponding file data to the storage server 300 so that the storage server 300 can facilitate execution of the requested data access operation using alternate means. Sending 1112 the metadata and file data to the storage server 300 or another storage agent 212 may also be referred to as proxying. For example, in one embodiment, the storage server 300 may fulfill the data access operation. In an alternate embodiment, the storage server 300 may request that a distinct storage agent 212 fulfill the request in proxy for the first storage agent 212. In a further embodiment, the first storage agent 212 may proxy 1112 the data access request directly to a second storage agent 212 instead of to the storage server 300. After proxying 1112 the data access request, the depicted failover method 1100 then ends 1114.

The present invention, in one embodiment, allows the storage agent 212 to perform some minimal metadata processing, but reserves to the storage server 300 most of the metadata processing and storage responsibilities. In this way, the metadata duplication and unnecessary use of LAN 102 resources is minimized. The present invention, in one embodiment, also provides a failover method 1100 that limits overhead costs and network inefficiencies associated with a data access failure.

Although the foregoing embodiments focus on file data, it is also possible for a storage agent 212 to receive a data storage request for a directory or other types of "client objects" that do not require storage in the SAN 104. The metadata describing such a "client object" simply may be forwarded to the storage server 300 and stored as metadata in the centralized metadata database 312. Therefore, references to file data within the present application, including the claims that follow, is understood to be inclusive of this type of "client object" and other comparable data structures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A client apparatus for data access on a storage device connected to a storage area network, the apparatus comprising:

a first network interface configured to allow the apparatus to communicate with a storage server;

a second network interface configured to allow the apparatus to communicate with a storage device on a storage area network;

a storage management client configured to communicate with the storage server and coordinate use of the storage device;

a storage agent comprising a metadata management module configured to minimize metadata processing on the apparatus by communicating metadata to the storage server to be exclusively stored in a centralized metadata database on the storage server, the metadata comprising a file data characteristic, a device characteristic, a media characteristic, a positioning indicator, and an append position indicator, associated with file data corresponding to a client, and stored on a specified volume;

the storage agent receiving a write request from the client;

the storage agent further comprising a volume management module that sends a volume access request for the specified volume to the storage server, receives an available volume notification for the specified volume from the storage server, and sends a mount request to a storage device to mount the specified volume; and the storage agent further configured to communicate a volume attribute request to the storage server, receive the metadata from the centralized metadata database of the storage server, write to the file data on the specified volume using the metadata, and send updated metadata to the storage server.

2. The apparatus of claim 1, further comprising a volume management module configured to request exclusive access to the specified volume.

3. The apparatus of claim 2, wherein the volume management module is further configured to request priority access to the specified volume.

4. The apparatus of claim 2, wherein the volume management module is further configured to terminate the write on the storage device in response to a preemption notification from the storage server.

5. The apparatus of claim 2, wherein the volume management module is further configured to send a volume termination notification to notify the storage server in response to a completed write operation.

6. The apparatus of claim 1, further comprising a write module configured to write the file data to a storage device.

7. The apparatus of claim 1, further comprising a read module configured to read the file data from the storage device.

8. The apparatus of claim 1, further comprising a failover module configured to communicate the file data to the storage server in response to a data access failure.

9. A server apparatus for data access management on a storage device connected to a storage area network, the apparatus comprising:

a first network interface configured to allow the apparatus to communicate with a storage agent;

a centralized metadata database configured to exclusively store metadata from the storage agent, the metadata comprising a file data characteristic, a device characteristic, a media characteristic, a positioning indicator, and an append position indicator, associated with file data stored in a specified volume, and received by the storage agent from a client via a data access request; and a storage manager configured to manage a write request by the storage agent to a storage device, wherein the storage manager receives a volume access request for the specified volume, communicates an available volume notification for the specified volume to the storage agent, receives a mount request from the storage agent for the specified volume, mounts the specified volume, on the storage device, receives a volume attribute request from the storage agent, communicates the metadata from the centralized metadata database to the storage agent, and receives updated metadata from the storage agent.

10. The apparatus of claim 9, further comprising a second network interface configured to allow the apparatus to communicate with the storage device on the storage area network.

11. The apparatus of claim 9, wherein the storage manager is further configured to preempt use of the specified volume by a non-priority storage agent in response to the volume access request from a priority storage agent.

12. The apparatus of claim 9, wherein the storage manager is further configured to update the centralized metadata database with the update metadata in response to receiving the updated metadata from the storage agent.

13. A system for data access management on a storage device connected to a storage area network, the system comprising:

a first network configured to communicate network data;

a second network configured to communicate file data between a node and a storage device;

a storage server connected to the first network, the storage server having a storage manager and a centralized metadata database, the storage server configured to manage a write to the storage device;

a client computer connected to the first and second networks, the client computer having a storage management client, a metadata management module, and a storage agent, the storage management client configured to communicate with the storage server and coordinate use of the storage device, the metadata management module configured to minimize metadata processing on the client computer by communicating metadata to the storage server to be exclusively stored in the centralized metadata database, the metadata comprising a file data characteristic, a device characteristic, a media characteristic, a positioning indicator, and an append position indicator, associated with the file data, and stored on a specified volume, and the storage agent configured to receive a write request, send a volume access request to the storage server for the specified volume, receive an available volume notification for the specified volume from the storage server, send a mount request to the storage device to mount the specified volume, communicate a volume attribute request to the storage server, receive the metadata from the centralized metadata database of the storage server, write to the file data on the specified volume using the metadata, and send updated metadata to the storage server.

14. The system of claim 13, wherein the client computer further comprises a volume management module configured to request exclusive access to the specified volume.

15. The system of claim 13, wherein the client computer further comprises a failover module configured to communicate the file data to the storage server in response to a data access failure.

16. The system of claim 13, wherein the storage server is further configured to update the centralized metadata database with the updated metadata in response to receiving the new metadata from the storage agent.

17. A computer readable storage medium comprising computer readable code configured to carry out a method for data access management on a storage device connected to a storage area network, the method comprising:

receiving a write request from a client, the write request including metadata comprising a file data characteristic, a device characteristic, a media characteristic, a positioning indicator, and an append position indicator, associated with file data corresponding to the client, and stored on a specified volume on the storage device;

sending a volume access request for the specified volume to the storage server;

receiving an available volume notification for the specified volume from the storage server;

sending a mount request to the storage device to mount the specified volume;

communicating a volume attribute request to a storage server;

receiving the metadata from a centralized metadata database of the storage server;

processing the metadata at a storage agent;

writing to the data file on the storage device using the metadata according to a volume management scheme; and communicating updated metadata to the storage server and exclusively storing the updated metadata in the centralized metadata database.

18. The computer readable storage medium of claim 17, wherein the method further comprises the managing data access by the storage agent to the storage device.

19. The computer readable storage medium of claim 17, wherein the method further comprises communicating the file data to the storage server in response to a data access failure.

20. The computer readable storage medium of claim 17, wherein the method further comprises preempting use of a volume by a non-priority storage agent in response to a volume access request from a priority storage agent.

21. A method for data access management on a storage device connected to a storage area network, the method comprising:

receiving a data access request from a client, the data access request including metadata comprising a file data characteristic, a device characteristic, a media characteristic, a positioning indicator, and an append position indicator, associated with file data corresponding to the client, and stored on a specified volume;

sending a volume access request for the specified volume to a storage server of the storage area network;

receiving an available volume notification for the specified volume from the storage server;

sending a mount request to the storage device to mount the specified volume;

communicating a volume attribute request to a storage server;

receiving the metadata from a centralized metadata database of the storage server;

processing the metadata at a storage agent;

writing to the data file on the storage device using the metadata according to a volume management scheme;

communicating updated metadata to a storage server and exclusively storing the updated metadata in the centralized metadata database.

22. The method of claim 21, further comprising managing the data access by the storage agent to the storage device.

23. The method of claim 21, further comprising communicating the file data to the storage server in response to a data access failure.

24. An apparatus for data access management on a storage device connected to a storage area network, the apparatus comprising:

means for receiving a write request from a client, the write request including metadata comprising a file data characteristic, a device characteristic, a media characteristic, a positioning indicator, and an append position indicator, associated with file data corresponding to a client, and stored on a specified volume on the storage device;

means for sending a volume access request for the specified volume to a storage server the storage area network, receiving an available volume notification for the specified volume from the storage server, and sending a mount request to the storage device to mount the specified volume;

means for communicating the metadata to a storage server and exclusively storing the metadata in a centralized metadata database on the storage server; and means for communicating a volume attribute request to the storage server, receiving the metadata from the centralized metadata database of the storage server, writing to the file data on the specified volume using the metadata, and sending updated metadata to the storage server.

* * * * *